United States Patent
Fugger et al.

(10) Patent No.: US 7,789,014 B2
(45) Date of Patent: Sep. 7, 2010

(54) DEVICE FOR PRODUCING A HOT DRINK

(75) Inventors: Michael Fugger, Tacherting (DE); Gerhard Nüssler, München (DE); Albert Ostermaier, Stein a.d. Traun (DE); Frank Rieser, Gröbenzell (DE); Roland Vetter, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 757 days.

(21) Appl. No.: 10/593,768

(22) PCT Filed: Apr. 13, 2005

(86) PCT No.: PCT/EP2005/051621

§ 371 (c)(1),
(2), (4) Date: Jun. 11, 2007

(87) PCT Pub. No.: WO2005/099535

PCT Pub. Date: Oct. 27, 2005

(65) Prior Publication Data

US 2007/0283817 A1    Dec. 13, 2007

(30) Foreign Application Priority Data

Apr. 13, 2004  (DE) .................. 10 2004 017 831

(51) Int. Cl.
*A47G 19/14* (2006.01)
*A47J 31/00* (2006.01)

(52) U.S. Cl. .......................... 99/323; 99/290

(58) Field of Classification Search .......... 99/279–323; 426/77–84
See application file for complete search history.

(56) References Cited

U.S. PATENT DOCUMENTS

| 4,644,855 | A | * | 2/1987 | Woolman et al. ............. 99/280 |
| 5,379,682 | A | | 1/1995 | Andrew et al. |
| 5,957,033 | A | | 9/1999 | In-Albon |
| 5,967,019 | A | * | 10/1999 | Johnson et al. ............... 99/323 |
| 6,253,663 | B1 | | 7/2001 | Spencer |
| 6,321,638 | B1 | | 11/2001 | Schmed |
| 6,742,442 | B1 | * | 6/2004 | Su .............................. 99/281 |
| 7,328,651 | B2 | * | 2/2008 | Halliday et al. .............. 99/295 |
| 2003/0205144 | A1 | | 11/2003 | Spencer |

FOREIGN PATENT DOCUMENTS

| CH | 690 224 | 6/2000 |
| DE | 197 01 033 | 7/1997 |
| EP | 0 761 150 | 3/1997 |
| EP | 0 783 859 | 7/1997 |

OTHER PUBLICATIONS

International Search Report PCT/EP2005/051621.

* cited by examiner

*Primary Examiner*—Daniel Robinson
(74) *Attorney, Agent, or Firm*—James E. Howard; Andre Pallapies

(57) ABSTRACT

A device for producing a hot drink, said device comprising an appliance unit which is arranged in a receiving cavity while the device is in use, and a residual water recipient which is arranged in the appliance unit while the device is in use.

20 Claims, 4 Drawing Sheets

DEVICE FOR PRODUCING A HOT DRINK

Figure 1:
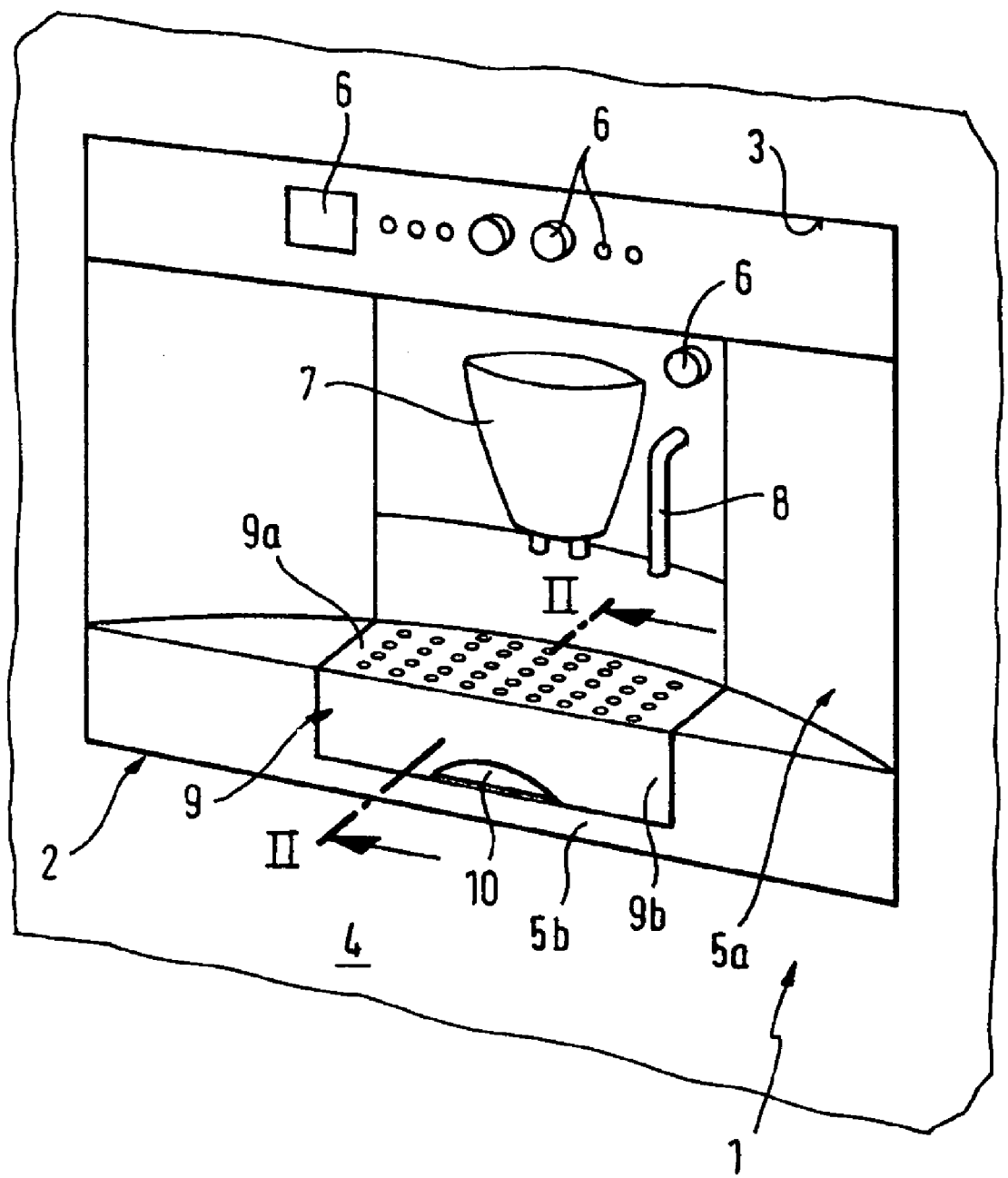

The invention relates to a device for producing a hot drink.

Such a device is, for example, a built-in coffee machine such as is known, for example, from EP 1051941 A2. The built-in coffee machine known from EP 1051941 A2 comprises an appliance unit comprising a housing which is fixed to an extension means and which can be pulled out of a receiving cavity with the aid of said extension means to replenish beans or water, for example, or to carry out repairs, and a residual water tray which can be removed from the housing. The housing additionally comprises a front wall which is aligned substantially flush with the wall of the furniture surrounding the opening of the receiving cavity or the niche. For pulling out the appliance unit, the user must first pull on some projection at the front wall of the housing, for example, the coffee spout, until he has pulled the front wall so far from the receiving cavity that he can grip the front wall from below to pull the housing completely out of the receiving cavity.

It is the object of the invention to provide a device for producing a hot drink wherein the appliance unit can be pulled out conveniently and simply from the receiving cavity and the residual water tray can be pulled out conveniently and simply from the housing.

The object is achieved by a device for producing a hot drink comprising an appliance unit which is arranged in a receiving cavity while the device is in use as intended and comprising a residual water tray which is arranged in the appliance unit while the device is in use as intended, characterized in that the device comprises means for removing the appliance unit from the receiving cavity and means for removing the residual water tray from the appliance unit and the means for removing the appliance unit from the receiving cavity and the means for removing the residual water tray from the appliance unit at least partly overlap.

According to a preferred embodiment of the device according to the invention, the means for removing the appliance from the receiving cavity comprises a first gripping surface arranged at the appliance unit and an opening at the appliance unit via which the first gripping surface is accessible and the means for removing the residual water tray from the appliance unit comprise a second gripping surface arranged at the residual water tray and the opening on the appliance unit via which the second gripping surface is accessible. As a result of the embodiment according to the invention, gripping surfaces with which both the appliance unit and also the residual water tray can be pulled out easily and simply, are arranged in a constructively simple manner. The two gripping surfaces are accessible via the same opening in the housing which makes it extremely simple for the user to localize their arrangement. Also, a single opening in the front wall does not disturb the design as enduringly as a plurality of openings would do.

If, according to one variant of the device according to the invention, the opening is provided at an interface between a front wall of the residual water tray and a front wall of the housing and the second gripping surface is provided on one side of the opening on the rear side of the front wall of the residual water tray and the first gripping surface is provided on the other side of the opening on the rear side of the front wall of the housing, then, on the one hand, it is very simple for the user to apply the force necessary for pulling out and on the other hand, the two gripping surfaces can be clearly separated in their function as a result of their arrangement on different sides of the opening so that the user has no difficulties in pulling out the respectively desired part.

Appropriately, according to one embodiment of the invention, the appliance unit is detachably anchored in the receiving cavity so that any unintentional pulling out, for example, when pulling out the residual water tray, is avoided.

According to a further variant of the device according to the invention, the anchoring of the appliance unit in the receiving cavity is preferably effected by a detachable locking system which makes any unintentional pulling out more difficult; this is particularly the case if the locking system preferably comprises a spring-loaded latching portion.

Pulling out the appliance unit is further facilitated if, according to particularly preferred embodiments, the actuating element of the locking system is accessible via the opening or is arranged in the gripping area of the first gripping surface so that the user reaches both the actuating element and the gripping surface with one grip.

According to a further variant of the device according to the invention, the locking system comprises a latching lever which tilts about a horizontal axis, this lever being provided with a latching portion on its one arm and having a latching surface on its other arm, which extends substantially parallel to the first gripping surface.

In order to prevent the residual water tray from becoming unintentionally detached from the housing, when the appliance unit is withdrawn from the receiving cavity, according to a further variant of the device according to the invention, the residual water tray is detachably anchored in the housing.

Since the residual water tray is relatively light compared with the appliance unit, according to one variant of the device according to the invention it is sufficient to anchor the residual water tray in the housing by a positive and/or frictional inhibition.

Figure 2:
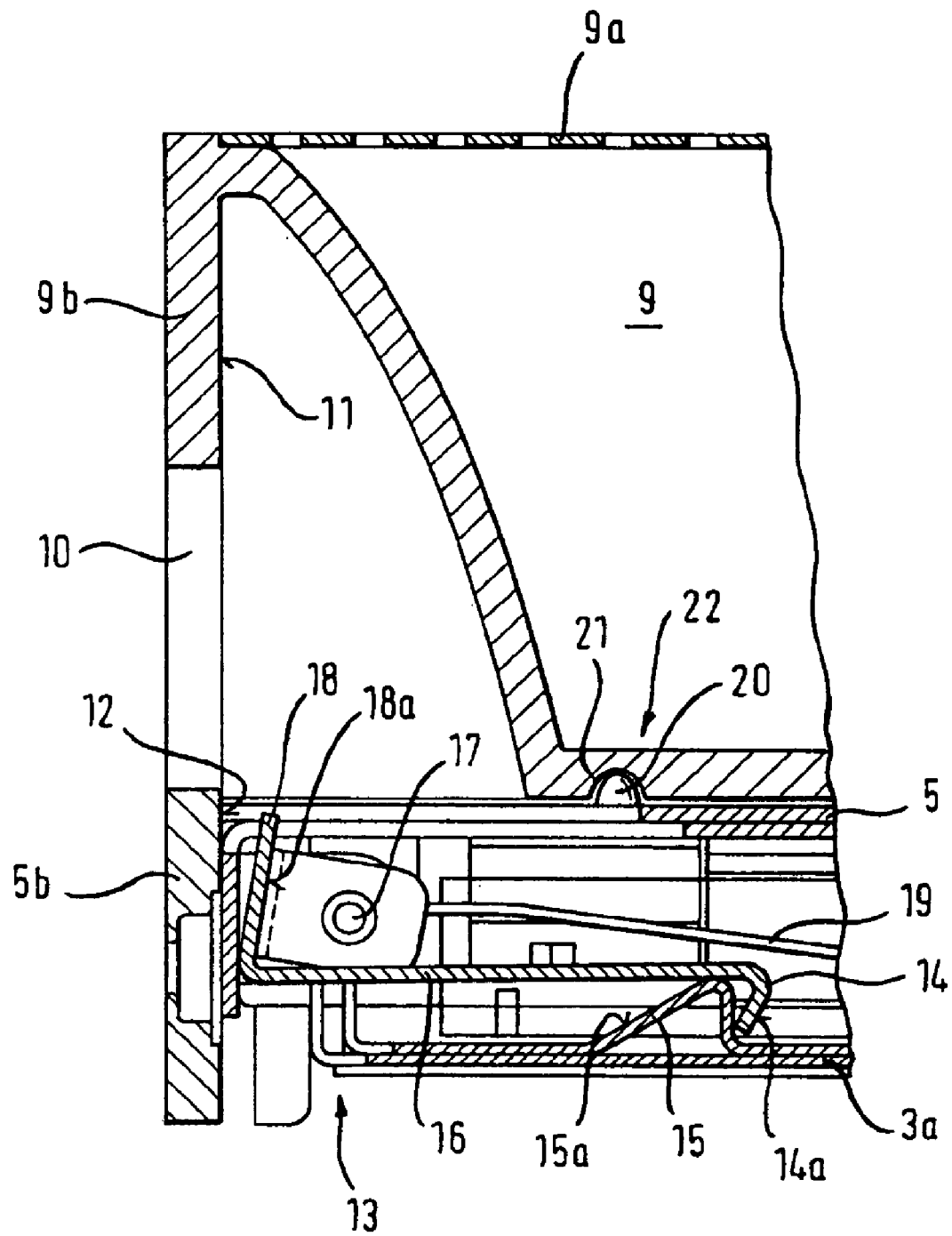
Figure 3:
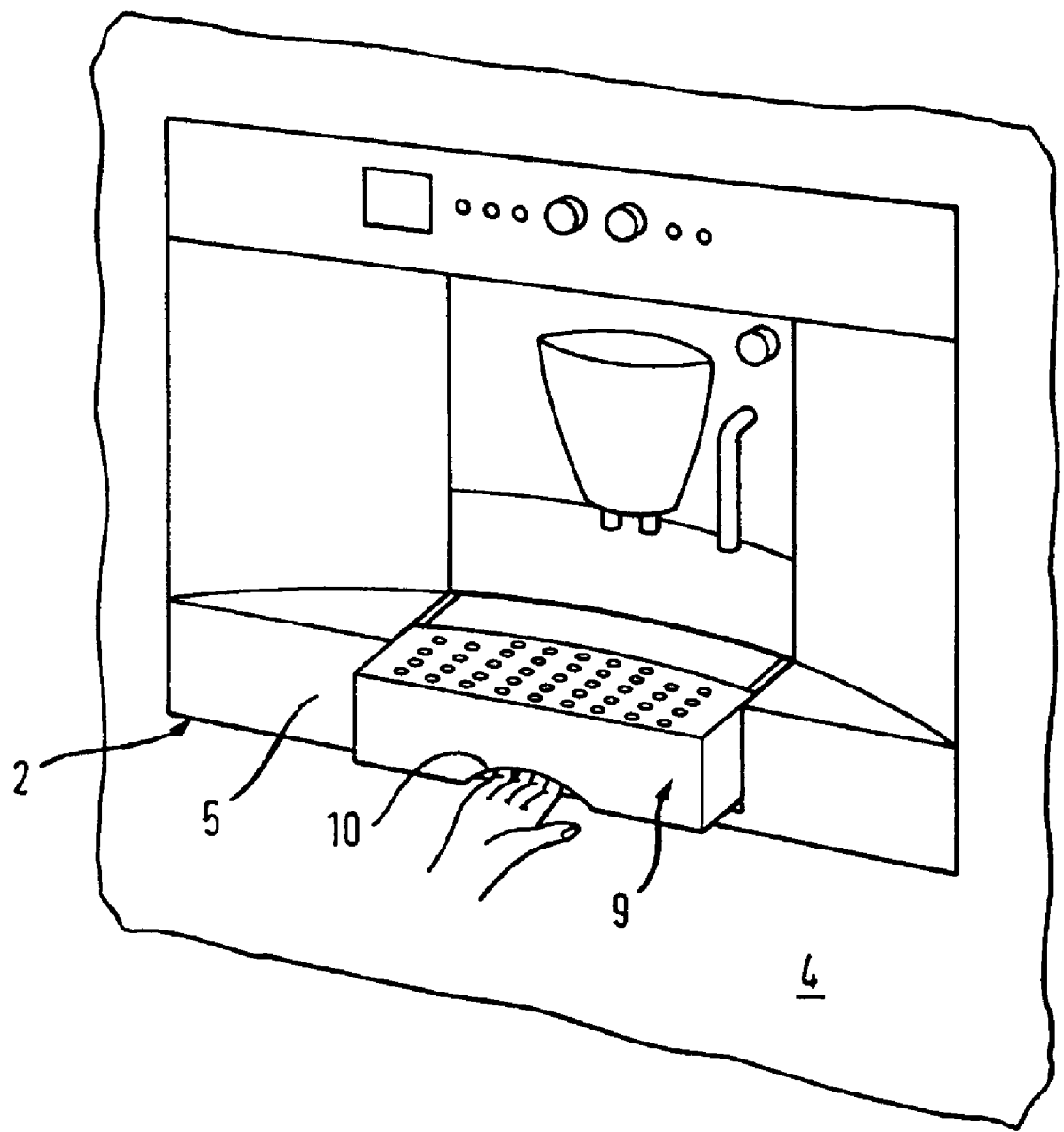
Figure 4:
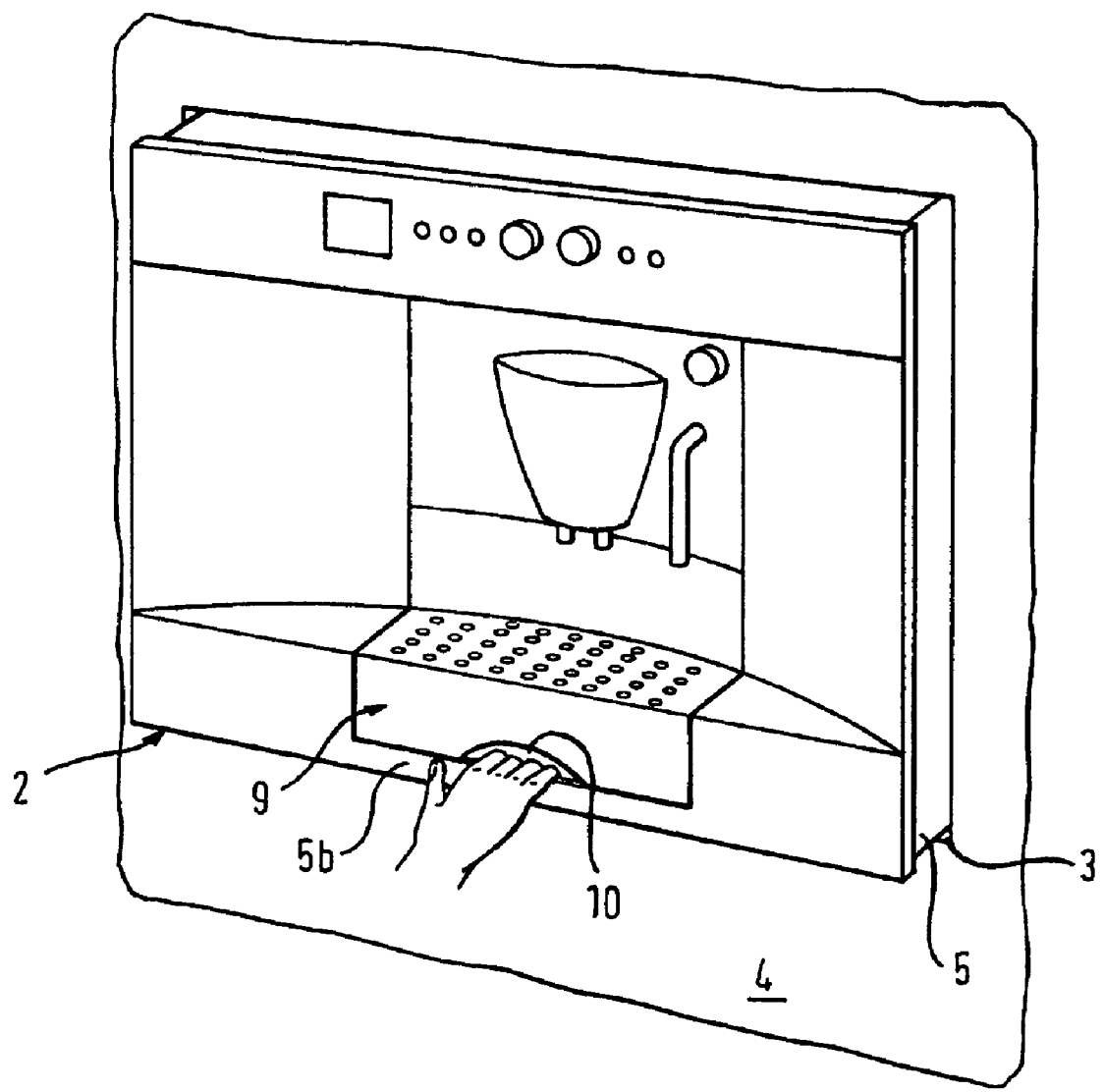

An exemplary embodiment of a device according to the invention for producing a hot drink in the form of a built-in coffee machine is described in detail hereinafter with reference to the schematic drawings. In the figures:

FIG. 1 is a schematic partial front view of a built-in coffee machine constructed according to the invention, FIG. 2 shows the section II-II from FIG. 1, FIG. 3 shows the coffee machine according to the invention during withdrawal of the residual water tray, and FIG. 4 shows the coffee machine according to the invention during withdrawal of the housing.

FIG. 1 shows a schematic partial front view of a built-in coffee machine 1, which contains an appliance unit 2, i.e., the actual coffee machine, which is accommodated in a receiving cavity 3 (FIG. 4) of a built-in structure 4, that is, for example a kitchen or other furniture, a wall niche or similar.

The appliance unit 2 contains a housing 5 (FIG. 4) with a front wall 5a facing the user and the usual control and display elements 6 as well as an outlet 7 for coffee drink and an outlet 8 for hot water and/or milk froth. The built-in coffee machine can be constructed in a known manner with regard to the configuration of the appliance unit 2 and the receiving cavity 3.

A residual water tray 9 is recessed in the housing 5, this being covered on its upper side facing the outlets 7 and 8 with the usual perforated sheet 9a on which the container to be filled can be placed and through which dripping or overflowing liquid can be drawn off and collected in the residual water tray 9. The residual water tray 9 further contains a front wall 9b which, in the present exemplary embodiment, is arranged adjacent to a front wall 5b of the housing 5. In particular, the front wall 5b extends over a region underneath the front wall 9b of the residual water tray 9 and directly adjoins this tray. An opening 10 is provided at the interface between the front wall 9b of the residual water tray 9 and the front wall 5b of the housing 5, this opening extending in the present exemplary embodiment through the front wall 9b and being provided at the lower interface between the front wall 9b to the front wall 5b. In the present exemplary embodiment, the opening 10 has a hemispherical or circular-segment-shaped form with a curved boundary line without corners and is large enough that a hand of an average-sized user can be placed comfortably through said opening.

A first gripping surface 11 is formed on one side of the opening 10, preferably above the opening 10, on the rear side of the front wall 9b of the residual water tray 9, this gripping surface being accessible via the opening 10 for pulling out the residual water tray 9. In the present exemplary embodiment, the entire rear side of the front wall 9b surrounding the opening 10 serves as the gripping surface 11.

Located on the other side of the opening 10 is a second gripping surface 12 which is provided for pulling out the appliance unit at the rear side of the front wall 5b of the housing 5 which bounds the opening 10 and which is preferably being formed thereby. The gripping surface 12 is also accessible via the opening 10.

A locking system 13 which anchors the appliance unit 2 in the receiving cavity 3 is provided between the appliance unit 2 and the receiving cavity 3, preferably a mounting frame 3a mounted firmly in the receiving cavity 3. The locking system 13 contains a latching portion 14 arranged on the appliance unit 2 which is embodied as hook-shaped and which grips over a correspondingly shaped counterhook 15 on the mounting frame 3a. The latching portion 14 is part of a latching lever 16 which is mounted in the housing 5 so that it can rotate about an axis 17. The axis 17 is preferably horizontally aligned and is located near the gripping surface 12 below the opening 10.

Both the latching portion 14 and the counter-latching portion 15 contain approach surfaces 14a, 15a which engage with one another to raise the latching portion 14 above the counter-latching portion 15 when inserting the residual water tray 9.

On the side of the axis 17 facing away from the latching portion 14, the latching lever 16 contains a leg 18 which projects upward, i.e. in the direction of the opening 10, which forms an actuating element for the locking system 13. On its front side the leg 18 contains an actuating surface 18a which is located in the gripping area of fingers which extend through the opening 10. The actuating surface 18a is located in front of the gripping surface 12 and extends substantially parallel or at an angle of up to about 20° to the gripping surface 12 when the latching portion 14 is in engagement with the counter-latching portion 15. In this position, the latching portion 14 is preferably loaded by a spring 19 which can either be a helical spring slung around the axis 17 and anchored at one side on the housing 5, a leaf spring, or any other suitable spring.

To release the locking system 13, the latching lever 16 is tilted about the axis 17 and against the force of the spring 19 by pressing on the actuating surface 18a until the latching portion 14 is released from the counter-latching portion 15. Then, the leg 18 preferably hits against the gripping surface 12. As a result of the position of the actuating surface 18a, the locking system 13 is thus released by a pressure exerted in the same direction as for pulling out the appliance unit 2.

The leg 18 with its actuating surface 18a can extend perpendicularly to the plane of the drawing in FIG. 2 over substantially the entire length of the opening 10 so that a user always reaches the actuating surface 18a regardless of the point at which he grips into the opening 10.

The residual water tray 9 is furthermore anchored in the housing 5 of the appliance unit 2. This should in particular prevent the residual water tray 9 from opening or even separating from the housing 5 if the appliance unit 2 is accidentally pulled out from the cavity 3 or pushed into said cavity with a jerk or at high speed. The anchoring must accordingly merely inhibit the residual water tray 9, i.e. withstand only weak forces. This can preferably be effected by friction which can be accomplished by limited play between the residual water tray 9 and the structures of the housing 5 surrounding this or by a separate friction rail or similar. However, it is also possible to provide a positive inhibition 19, as shown in FIG. 2. The positive inhibition 19, for example, contains a small projection 20 on the housing 5 which engages in a recess 21 on the residual water tray 9, wherein the dimensions, in particular the height, can be relatively small so that it is sufficient merely to slightly raise the residual water tray 9 during removal.

If a user wishes to remove the residual water tray 9 from the housing 5 of the appliance unit 2, he grasps upward through the opening 10, as shown in FIG. 3 and pulls the residual water tray 9 from the housing 5 by pressing on the gripping surface 10, merely a slightly higher pressure being sufficient in the case of a frictional inhibition whereas in the case of a positive inhibition, the residual water tray 9 must be raised slightly at an angle, as shown in FIG. 3, with its recess 21 over the projection 20.

If a user wishes to pull the appliance unit 2 from the cavity 3, he grips downward through the opening 10 as shown in FIG. 4 and initially presses on the actuating surface 18a in the pulling-out direction. The latching portion 14 is thereby tilted about the axis 17 and is raised against the force of the spring 19 over the counter-latching portion 15 so that if pressure continues to be exerted on the actuating surface 18a, the appliance unit 2 can finally be pulled out from the receiving cavity 3. in this case, the leg 18 preferably bears against the gripping surface 18 so that pressure can be optimally applied for pulling out. However, it is also possible to release the actuating surface 18a after releasing the locking system 13, whereupon the latching lever 16 pivots back through the action of the spring 19 and the remaining pullout distance is merely covered by pressing on the gripping surface 12. This has the advantage that the entire applied force can be used to pull out the appliance unit 2 and not part thereof to overcome the spring force 19.

If the appliance unit 2 is to be inserted into the cavity 3 again, for example, after cleaning, refilling with water and/or beans or similar, pressing at any point of the appliance unit 2 is sufficient to accomplish this. As soon as the approach surface 14a of the latching element 14 impinges upon the approach surface 15a of the counter-latching element 15, the spring force is overcome and the locking system 13 snaps in place.

In a modification of the exemplary embodiment which has been described and shown in the drawings, the opening 10 can also be provided in the front wall of the housing or both in the front wall of the residual water tray and in the front wall of the housing. The anchoring of the appliance unit can be accomplished by other known measures and the locking system can be implemented by other known latching or fastening devices. Also the locking system must not necessarily be provided in the area of the opening but can, for example, be arranged at a position where it can be released by a hand of the user while the other hand of the user effects the pulling out.

The invention claimed is:

1. A device for producing a hot drink comprising:
   an appliance unit which is arranged in a receiving cavity while the device is in use;
   a residual water tray which is arranged in the appliance unit while the device is in use;
   means for removing the appliance unit from the receiving cavity; and
   means for removing the residual water tray from the appliance unit,
   wherein the means for removing the appliance unit from the receiving cavity and the means for removing the residual water tray from the appliance unit at least partly overlap.

2. The device according to claim 1, wherein the means for removing the appliance from the receiving cavity comprises a first gripping surface arranged at the appliance unit and an opening at the appliance unit via which the first gripping surface is accessible, the means for removing the residual water tray from the appliance unit comprising a second gripping surface arranged at the residual water tray and the opening on the appliance unit via which the second gripping surface is accessible.

3. The device according to claim 2, wherein the opening is disposed at an interface between a front wall of the residual water tray and a front wall of the housing, the second gripping surface being disposed on a first side of the opening on a rear side of the front wall of the residual water tray, the first gripping surface being disposed on a second side of the opening opposite the first side on the rear side of the front wall of the housing.

4. The device according to claim 1, wherein the appliance unit is detachably anchored in the receiving cavity.

5. The device according to claim 4, further comprising a detachable locking system disposed between the appliance unit and the receiving cavity.

6. The device according to claim 5, wherein the locking system comprises a spring-loaded latching portion and an actuating surface which is accessible via the opening.

7. The device according to claim 6, wherein the actuating surface is arranged in the gripping area of the first gripping surface.

8. The device according to claim 5, wherein the locking system comprises a latching lever which tilts about a horizontal axis, the latching lever including a latching portion on its one arm and having an actuating surface on its other arm, which extends substantially parallel to the first gripping surface.

9. The device according to claim 1, wherein the residual water tray is detachably anchored in a housing of the appliance unit.

10. The device according to claim 1, wherein the residual water tray is anchored in the appliance unit by at least one of a positive and frictional inhibition.

11. The device according to claim 1, wherein the device includes a built-in coffee machine.

12. An apparatus for producing a hot drink, the apparatus comprising:
    a receiving cavity;
    an appliance unit removably and replaceably arranged in the receiving cavity;
    a residual water tray removably and replaceably arranged in the appliance unit;
    an appliance unit removal device located in the appliance unit and having an actuating portion, the appliance unit removal device being movable between a removal position, in which the appliance unit removal device permits the appliance unit to be removed from the receiving cavity, and a secured position, in which the appliance unit removal device prevents the appliance unit from being removed from the receiving cavity;
    a residual water tray removal device located in the appliance unit and having an actuating portion, the residual water tray removal device being movable between a removal position, in which the residual water tray removal device permits the residual water tray to be removed from the appliance unit, and a secured position, in which the residual water tray removal device prevents the residual water tray from being removed from the appliance unit; and
    an access portal located in the appliance unit, the access portal allowing access to the actuating portion of the appliance unit removal device and the actuating portion of the residual water tray removal device.

13. The apparatus according to claim 12, wherein the actuating portion of the appliance unit removal device comprises a first gripping surface located on the appliance unit, and
    the actuating portion of the residual water tray removal device comprises a second gripping surface located on the residual water tray.

14. The apparatus according to claim 13, wherein the access portal is disposed at an interface between a front wall of the residual water tray and a front wall of the appliance unit, the second gripping surface being disposed on a rear side of the front wall of the residual water tray, and the first gripping surface being disposed on a rear side of the front wall of the appliance unit.

15. The apparatus of claim 14, wherein the appliance unit removal device further comprises a spring-loaded latching portion that engages a mating surface in the receiving cavity when the appliance unit is arranged in the receiving cavity.

16. The apparatus according to claim 15, wherein the appliance unit removal device further comprises a latching lever having two arms and which tilts about an axis, the latching lever including the latching portion on one of its arms and the actuating portion on the other of its arms.

17. The apparatus according to claim 16, wherein the residual water tray removal device has a detent,
    the appliance unit has a protrusion, and
    the detent engages the protrusion when the residual water tray is arranged in the appliance unit.

18. The apparatus according to claim 16, wherein the residual water tray removal device has a protrusion,
    the appliance unit has a detent, and
    the detent engages the protrusion when the residual water tray is arranged in the appliance unit.

19. The apparatus according to claim 15, wherein the residual water tray removal device has a detent,
    the appliance unit has a protrusion, and
    the detent engages the protrusion when the residual water tray is arranged in the appliance unit.

20. The apparatus according to claim 15, wherein the residual water tray removal device has a protrusion,
    the appliance unit has a detent, and
    the detent engages the protrusion when the residual water tray is arranged in the appliance unit.

* * * * *